(12) United States Patent
Ewert et al.

(10) Patent No.: US 7,042,340 B2
(45) Date of Patent: May 9, 2006

(54) VEHICLE MOUNTED ANIMAL ALERTING DEVICE

(76) Inventors: Roger D. Ewert, 8548 Aqua Dr., Nekoosa, WI (US) 54457; Steven J. Ylvisaker, 222 Valleyview Pl., Minneapolis, MN (US) 55419; Tom N. Thiele, 3511 Big Timber Dr., Wisconsin Rapids, WI (US) 54494

( * ) Notice: Subject to any disclaimer, the term of this patent is extended or adjusted under 35 U.S.C. 154(b) by 0 days.

(21) Appl. No.: 10/645,300

(22) Filed: Aug. 21, 2003

(65) Prior Publication Data
US 2005/0040935 A1    Feb. 24, 2005

(51) Int. Cl.
*G08B 3/00* (2006.01)

(52) U.S. Cl. ............... 340/384.1; 340/436; 340/384.2; 340/384.3; 367/139; 116/22 A; 180/272

(58) Field of Classification Search ............... 340/436, 340/384.1, 384.2, 384.3, 439, 575, 576; 367/139; 116/22 A; 180/272
See application file for complete search history.

(56) References Cited

U.S. PATENT DOCUMENTS

| | | | |
|---|---|---|---|
| 3,516,384 A | 6/1970 | Will | |
| 4,091,383 A | 5/1978 | Rainville | |
| 4,437,428 A | 3/1984 | Hoffelner | |
| 4,998,091 A | 3/1991 | Rezmer | |
| 5,061,918 A | 10/1991 | Hunter | |
| 5,278,537 A | 1/1994 | Carlo et al. | |
| 5,418,518 A | 5/1995 | Schenken et al. | |
| 5,515,026 A | 5/1996 | Ewert | |
| 5,602,523 A | 2/1997 | Turchioe et al. | |
| 5,969,593 A | 10/1999 | Will | |
| 6,104,283 A * | 8/2000 | Otomo | 340/384.2 |
| 6,130,605 A * | 10/2000 | Flick | 340/426.23 |
| 6,252,496 B1 | 6/2001 | Jackson | |
| 6,677,853 B1 * | 1/2004 | Canfield | 340/384.2 |

OTHER PUBLICATIONS

WPH&E, Inc., Final Report—Contract No. DTRS57-00-C-1006, Development of a Commercial Vehicle-Based Animal Deterrent, Jul. 2001, Biron, Wisconsin.

* cited by examiner

Primary Examiner—Daniel Wu
Assistant Examiner—Samuel J. Walker
(74) Attorney, Agent, or Firm—Reinhart Boerner Van Dueren s.c.

(57) ABSTRACT

An animal alerting device system and method for mounting in a vehicle produces a sound that stimulates an alertness response in large animals to reduce the likelihood that the animals will run into a roadway and cause an animal-vehicle crash. The sound produced by the device is a random sound pattern in an audible frequency range. The volume of the sound produced is automatically adjusted for vehicle speed. Different sound patterns may be produced automatically based on different geographical locations of the vehicle in which the device is mounted.

45 Claims, 5 Drawing Sheets

VEHICLE MOUNTED ANIMAL ALERTING DEVICE

The invention was made with Government support under Contract No. DTRS57-00-C-1006 awarded by the Department of Transportation. The Government has certain rights in the invention.

FIELD OF THE INVENTION

The present invention pertains generally to systems and methods for alerting animals and, more particularly, to animal alerting devices mounted on vehicles for use as animal crash deterrent devices to reduce the likelihood that animals will wander or run into the path of a moving vehicle.

BACKGROUND OF THE INVENTION

A significant and ongoing cause of vehicle damage and risk to life and limb on our nation's roadways is animal-vehicle crashes. Of particular concern are animal-vehicle crashes involving large animals, such as deer, which occur at highway speeds. Typically, such crashes result from the deer or other large animal wandering or dashing in a panic onto a roadway in front of an oncoming vehicle. At highway speeds, the speed of the vehicle makes it almost impossible for the driver to avoid a crash in many cases. This is particularly true since many animals, such as deer, are most active in the low light conditions of dawn and dusk, times at which visibility is reduced and, therefore, available driver reaction time is reduced even further. Costly and dangerous animal-vehicle crashes can occur, however, at any time of day and even at less than full highway speeds.

Many and various attempts have been made to reduce the incidence of animal-vehicle crashes by mounting devices on a vehicle in an attempt to warn or scare animals away from the path of the oncoming vehicle. Many such vehicle mounted devices emit ultrasonic sound waves. A common device of this type is the deer whistle. This purely mechanical device is mounted on a vehicle so that wind passing through the whistle at highway speeds causes the emission of sounds in an ultrasonic frequency range. These devices have proved to be relatively popular, because they are inexpensive. Other systems have employed electronic circuitry to drive one or more speakers to emit ultrasonic sound waves in a variety of different sound patterns. A great advantage of such systems is that the sound emitted is inaudible to humans and, therefore, there is little concern that the driver or passengers or others in the area of the vehicle will be disturbed by the sound produced by such a system. The great disadvantage of devices that produce sounds in an ultrasonic frequency range is that they are ineffective for the prevention of animal-vehicle crashes. In particular, research on animal audio-perception has indicated that white-tail deer hear in the same general range as humans. Therefore, devices that produce sounds in an ultrasonic frequency range will have no affect on preventing deer from wandering or running into an oncoming vehicle either at the front or the side of the vehicle, since the ultrasonic sounds produced by such devices cannot be heard by deer.

Realizing the ineffectiveness of warning systems that have attempted to use ultrasonic sound to scare off deer to reduce the possibility of an animal-vehicle collision, the Total Alert Driver Safety System described in U.S. Pat. No. 5,515,026 to Roger Ewert includes a unit mounted in a car or other vehicle that produces natural sounds in the audible frequency range of 1–20 kHz. The described system employs natural sounds, e.g., clicks, snaps, cracks, pops, crunches, ticks, claps, zaps, etc., in the suggested frequency range that are generated by an electronic sound generator and produced by a speaker mounted on the vehicle. The natural sounds could be recorded, isolated, filtered, digitized, and stored in memory, or a mathematical function which nearly simulates a particular sound could be used to generate the sound wave form. The natural sounds generated by such a system have been found not to induce panic in deer, but rather to induce a natural avoidance instinct, causing the deer to stand alert or wander away from vehicles employing such a system. This system employed switches that might be configured to produce variable sound patterns and intervals which periodically might be reprogrammed to prevent deer and other animals from growing accustomed or "immune" to the alerting signal. The system also received input from a transducer mounted to the vehicle drive train, or from a car's electronic speed sensor or vehicle computer, to determine vehicle speed. Transmission of the animal alerting sound by the system might be initiated manually (e.g., using a foot switch provided in the vehicle) or automatically when the vehicle exceeded a particular speed (e.g., 35 miles per hour). The volume of the sound emitted by the system might be increased as the vehicle velocity increased. Thus, the audible sound emitted by the system preferably was activated, and the volume increased, only at relatively high speeds at which deer-vehicle crashes were most likely to occur, where increased volume was required and, since such high speed travel is unlikely to occur in typical residential or commercial areas, away from areas in which the audible sound might be heard by residents and pedestrians. In addition to sound generation, the system described in U.S. Pat. No. 5,515,026, as well as other systems in the prior art, suggests also the use of flickering lights, e.g., flickering the vehicle headlights momentarily and repeatedly, to create a flickering affect, to reduce the likelihood that an animal will fixate on the oncoming lights of the vehicle and to facilitate the animal's natural avoidance response to the broadcast sound. A separate strobe light might be provided and controlled to flicker in synch with the sounds from the system's speaker.

Although the system described in U.S. Pat. No. 5,515,026 was found to be more effective than systems that generate ultrasonic sounds to alert deer and other large animals to an oncoming vehicle, further improvements are possible. What is desired, therefore, is an improved vehicle mounted animal alerting device that generates sound patterns that are better adapted to induce an alertness response in deer or other large animals, thereby to reduce the chances that such animals will wander or run into the path of an oncoming vehicle in which such a system is mounted. The system preferably automatically adjusts parameters of the audible sound produced thereby in response to vehicle operating conditions. This optimizes the effectiveness of the sounds produced by the system to stimulate the alertness response of animals in the area of the vehicle under vehicle operating conditions for which an animal-vehicle crash is most likely to occur.

SUMMARY OF THE INVENTION

The present invention provides an animal alerting device for mounting on a vehicle, such as a car, truck, aircraft, locomotive, etc., that emits a sound pattern in the audible frequency range to stimulate alertness in large animals, such as deer, in the vehicle area. An animal alerting device in accord with the present invention is implemented as an electronic system, preferably including a microprocessor based system for generating a desired sound pattern that is amplified and used to drive a speaker, such as a piezo-electric speaker, mounted on the vehicle. The animal alerting device may receive manual input (e.g., to turn the device on) as well as input (e.g., speed information) from the on-board computer of the vehicle to which the device is mounted to control when the production of sound patterns by the system is activated, as well as the volume of sound production. Input from a vehicle position detector may be used to control characteristics of the sound produced by the system. The sounds produced by an animal alerting device in accord with the present invention generally are randomly selected or generated groups of sounds in the audible frequency range of generally 1 kHz–5 kHz. Each group of sounds in the sound pattern may include one or more sounds in the desired frequency range that are separated from each other by short silent periods (e.g., about one-tenth of a second), with the groups of sounds themselves separated by a relatively longer silent period (e.g., about one second).

An animal alerting device in accord with the present invention may be implemented using conventional electronic circuitry, and preferably is implemented as a conventional microprocessor based system employing a conventional microprocessor or microcontroller with conventional memory associated therewith. The memory associated with the processor may be used to store the required programming instructions for generating the sound pattern produced by the system, as well as digitized pre-recorded sounds having the desired frequency characteristics, or algorithms for generating such sounds. Conventional driver circuitry may be employed to amplify the sound patterns generated or selected by the system processor to drive a speaker, e.g., a piezo-electric speaker, to produce the sound pattern at the desired volume. Simple operator inputs (e.g., switches) and indicators (e.g., LEDs) may be provided to allow an operator to control operation of the system (e.g., turn the system on, change operating modes, etc.) and to allow the processor to indicate to the operator that the system is operating (e.g., that the system is on and producing sounds). The operator inputs and/or indicators may be incorporated in the same container that is used to house the other operational components of the system or in a separate smaller container that may be mounted on a vehicle remotely from the other components to facilitate use thereof.

The volume of the sound pattern produced by an animal alerting device in accord with the present invention preferably is varied automatically in response to changes in the speed of the vehicle on which the device is mounted. For example, at vehicle speeds less than a certain selected threshold vehicle speed (e.g., for city driving) an animal-vehicle collision is less likely to occur as the vehicle is likely to be operating in a residential or commercial area. At such speeds the production of sound by the system preferably is entirely suppressed or defeated, since the need for sound production is reduced and, at such speeds, there is more likelihood that the audible sounds produced by the system will be noticed by nearby residents or pedestrians. As the speed of the vehicle increases, however, sound production preferably is automatically initiated and the sound volume increased as the vehicle's speed increases. Thus, in accord with the present invention, increased sound production (volume) is provided at higher vehicle speeds, better to project the sound pattern from the vehicle under high speed conditions at which the risk of an animal-vehicle crash is increased. In accord with the present invention, the vehicle speed preferably is obtained by the system processor via a connection, e.g., via a conventional network port, such as the On-board Diagnostic Port Version II (the OBD II) port connection, to the vehicle on-board computer. In accord with the present invention, an operator preferably may be able (e.g., using a switch to select between different modes of operation) to select different threshold speeds at which sound production is automatically initiated by the system for different driving conditions.

The sound pattern produced by an animal alerting device in accord with the present invention preferably includes a random pattern of sound groups separated by silent periods. Each sound group preferably may include one or more sounds at one or more frequencies in the range of 1–5 kHz or, more generally, in the range of 1–10 kHz. Each sound within each sound group preferably is provided for a relatively short duration, e.g., approximately 60 milliseconds. The sounds within each sound group preferably are separated from each other by relatively short silent periods having a duration on the order of the duration of the sounds themselves, e.g., approximately one-tenth of a second. Each sound group and/or sound may be pre-generated and stored in memory for use by the system processor at the time of sound production. Alternatively, an algorithm may be employed to generate the sounds forming each sound group. During operation, sound groups are selected randomly (or randomly generated) by the processor and played by the system, at the desired volume, with a relatively long silent period between each sound group. The silent period between sound groups may be fixed (e.g., approximately one second between played back sound groups) or randomly selected.

It has been found that different sound patterns may be more effective than others in inducing the alertness response of different types of large animals that inhabit different areas. For example, moose may respond more effectively than deer to a particular sound pattern. Thus, the animal-vehicle crash hazard to which a vehicle is exposed may vary depending upon the area of the country (or world) in which the vehicle is operated. In accord with the present invention, a vehicle position detection system, such as a global positioning system (GPS) receiver, may be employed to provide a vehicle position indication to the animal alerting device system processor. The processor may employ this position information to select the sound pattern to be employed by the system to optimize animal alertness for the particular animals most likely to be encountered in the current area of operation of the vehicle.

Further objects, features and advantages of the invention will be apparent from the following detailed description, taken in conjunction with the accompanying drawings.

DETAILED DESCRIPTION OF THE INVENTION

Figure 1:
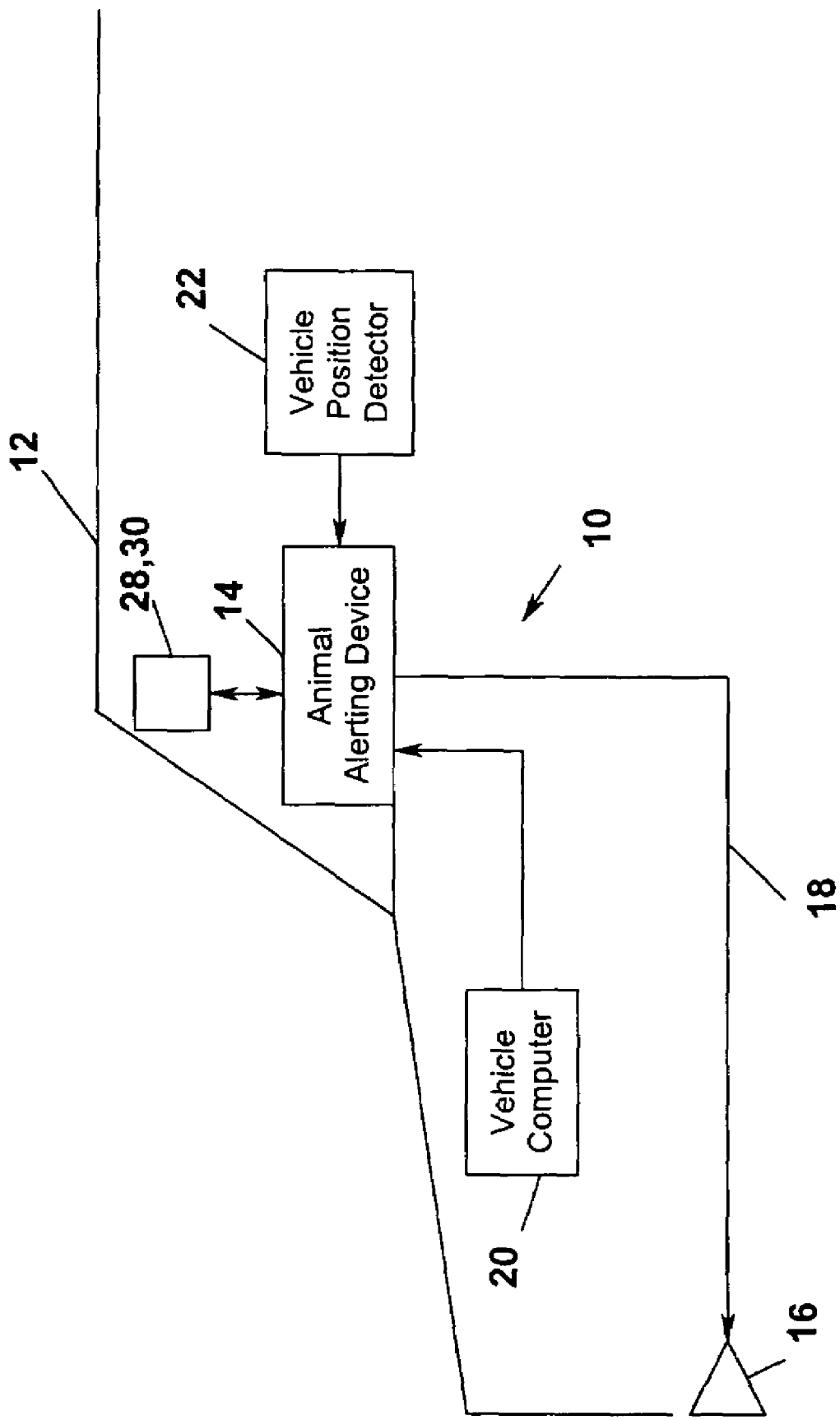
FIG. 1 is a schematic illustration of an animal alerting device in accord with the present invention as mounted on a vehicle such as an automobile.

The present invention provides an animal alerting device 10 that produces a sound pattern that stimulates an alertness response in animals, particularly large animals, such as deer, in the hearing range of the device. As illustrated in FIG. 1, an animal alerting device 10 in accord with the present invention is adapted to be mounted on a vehicle 12. The alertness response produced in animals by the animal alerting device 10 reduces the likelihood an animal will wander or run out into the path of the vehicle 12, thereby reducing the likelihood of animal-vehicle crashes. Although the animal alerting device 10 will be described in detail herein with reference to the mounting thereof on a conventional vehicle (automobile, truck, etc.) operating on roadways, it should be understood that an animal alerting device 10 in accord with the present invention may be mounted on any land vehicle (e.g., a locomotive) or other vehicle (e.g., an aircraft), for which it is desired to prevent animal-vehicle crashes. For example, an animal alerting device 10 in accord with the present invention may be mounted on an aircraft and used to reduce the likelihood of large animals wandering onto a runway during landing and/or take off operations. In addition to reducing the likelihood of animal-vehicle crashes, a vehicle mounted animal alerting device 10 in accord with the present invention may be employed for other purposes wherein it is desired to induce the alertness response of large animals. For example, animal alerting devices in accord with the present invention mounted on land based vehicles or aircraft may be employed to assist in driving animals toward or away from selected areas, e.g., as part of a ranching, animal management, or animal research project.

An animal alerting device 10 in accord with the present invention includes an electronic control system 14 that is used to drive a speaker 16 that emits the sound produced by the system. As will be discussed in more detail below, the animal alerting device control system 14 preferably is implemented as a microprocessor based system. The animal alerting device control system 14 circuitry preferably may be contained in a conventional enclosure, which may be mounted in the vehicle 12, e.g., on the dashboard thereof, or at any other location for convenient operation and monitoring thereof by an operator or passenger in the vehicle 12. Preferably, conventional circuitry is selected to implement the animal alerting device control system 14 such that the entire control system 14 may be contained in an enclosure that is not significantly larger than a conventional radar detector or similar device. The speaker 16 may be implemented as a conventional piezo-electric speaker. The speaker 16 preferably is mounted on the exterior of the vehicle, e.g., near the front thereof, (e.g., on the license plate or in an air intake vent of an automobile), such that the sound produced by the speaker 16 is projected forward as the vehicle 12 is in motion. A conventional wire connection 18 may be used to connect the animal alerting device control system 14 to the speaker 16. However, a conventional wireless connection also may be used to couple the animal alerting device control system 14 to the speaker 16. In such a case, separate power and/or driver circuitry may be required at the speaker 16. (Note that throughout this application specification connections between system components, where indicated, may be implemented as conventional wired or wireless connections.)

An animal alerting device 14 in accord with the present invention preferably may be coupled to the vehicle's on-board computer 20. This will be discussed in more detail below. Vehicle speed information obtained from the vehicle computer 20 may be employed by the animal alerting device control system 14 to control the volume of the sound produced by the animal alerting device 10. The animal alerting device 14 also may receive a position indication from a vehicle position detector 22. The vehicle position detector 22 may be implemented, for example, as a conventional GPS receiver that is provided as part of the vehicle 12 in which the animal alerting device 10 is mounted, as part of the animal alerting device 10 itself, or as a separate vehicle position detector system.

Figure 2:
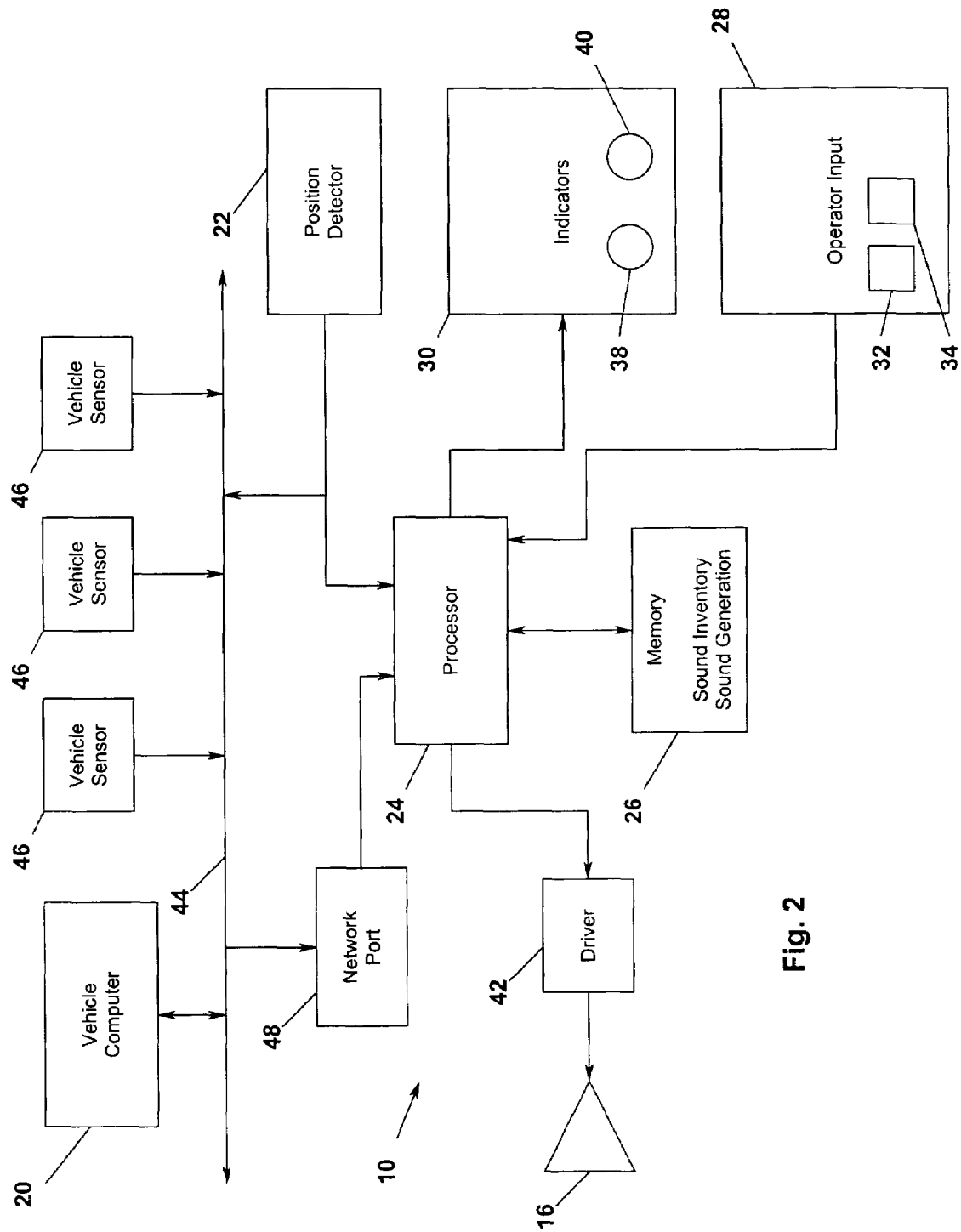
FIG. 2 is a more detailed schematic block diagram of an animal alerting device in accord with the present invention.

As illustrated in FIG. 2, an animal alerting device 10 in accord with the present invention preferably is implemented as a microprocessor based system. A conventional processor 24, which may be implemented as one or more programmable microprocessors, microcontrollers, etc., preferably is employed to control operation of the system. It should be understood, however, that the present invention may be implemented using any combination of conventional digital and/or analog circuitry that may be employed by a person of ordinary skill in the art to implement the functions of an animal alerting device in accord with the present invention as described herein.

Conventional memory 26, e.g., read-only (ROM) memory, may be provided as part of, or separate from, the system processor 24. Programming instructions for implementing the functions of an animal alerting device in accord with the present invention may be stored in memory 26. System memory 26 may include an inventory of pre-recorded digitized sounds for use in producing a sound pattern by the system, as will be described in more detail below, as well as sound generation programming instructions for selecting sounds from the inventory for incorporation in the produced sound pattern, and/or algorithms for generating sounds to be produced by the system.

Preferably, simplified operator input 28 and indicator 30 devices may be used to provide a degree of interaction between an animal alerting device 10 in accord with the present invention and an operator thereof, e.g., an operator of the vehicle 12 in which the animal alerting device 14 is mounted. (Preferably, an animal alerting device 10 in accord with the present invention is designed to operate substantially automatically, with minimal operator interaction required.) For example, conventional mechanical switches, e.g., rocker switches, may be provided, for example, to turn the animal alerting device on and off 32 and to select from between different modes of operation 34 (e.g., between town and country modes of operation), as will be discussed in more detail below. The operator indicators 30 may be implemented, for example, as conventional LEDs. The LED indicators 30 may be provided to indicate that, for example, the animal alerting device is turned on 38, and whether the animal alerting device is actually actively producing sound 40 (after the vehicle has achieved the minimum speed for producing sound or the test mode is activated). The operator input 28 and indicators 30 preferably may be mounted in the enclosure containing the animal alerting device control system circuitry, in a conventional manner for easy access thereto by an operator of the animal alerting device 10. Alternatively, the operator inputs 28 and/or indicators 30 may be mounted in a separate smaller container or housing (see FIG. 1) that may be mounted at a more convenient remote location in a vehicle 12 to facilitate use. Such remotely located operator inputs 28 and or indicators 30 may be coupled by either a wired or wireless connection to the other operational components of the system. In any case, conventional circuitry may be required and used to couple the operator input 28 and indicators 30 to the system processor 24.

As will be discussed in more detail below, an animal alerting device 10 in accord with the present invention preferably produces an animal alerting sound pattern only when the device is turned on, e.g., by operation of the on/off power switch 32, and the vehicle in which the device is mounted is operating at greater than a selected threshold speed. The threshold speed for initiating sound production by the device 10 may be selected by an operator thereof by operation of the mode selection switch 34 (e.g., to select from between town and country modes of operation), as will be discussed in more detail below. Preferably, operation of the on/off power switch 32 may be implemented such that if an operator leaves the switch in the "on" position the animal alerting device 10 will begin operation, in the manner to be described in more detail below, every time the vehicle in which the device 10 is mounted is started. To verify proper operation of the device 10, a test mode preferably is provided such that an operator may activate manually sound production even if the vehicle is stopped or otherwise has not reached the threshold speed at which sound production normally is initiated. Sound production during test mode operation may preferably be at a reduced or lowest normal operating volume level. The test mode may be initiated immediately upon system turn-on and last for a selected duration, such as the time needed for the system to identify the vehicle computer protocol (as will be discussed in more detail below). This both allows a test mode operation to be initiated using only the power switch 32 and provides for immediate sound production by the device upon turning on the system. Thus, if the device is turned on while the vehicle is operating at highway speeds (i.e., above the threshold speed for sound production, a speed at which an animal-vehicle crash is most likely to occur) the device will produce sound to provide protection from an animal-vehicle crash immediately, without the delay that otherwise might result from the device establishing communications with the vehicle on-board computer to determine the vehicle speed. At highway speeds sound production may thus be initiated immediately upon device turn on and will continue once communications with the vehicle computer is established to confirm vehicle speed above the threshold sound production speed. If the vehicle is operating at less than the threshold speed (e.g., stopped), the production of sound preferably will terminate briefly after the device is turned on, after the test mode operation period is complete.

It should be understood that other and/or different user inputs may be provided in an animal alerting device 10 in accord with the present invention. For example, a separate test mode input switch may be provided to allow an operator to activate a test mode of operation. A separate enable switch may be provided, in addition to the power on/off switch 32, to allow an operator to enable/disable sound production by the device once it is turned on. The device 10 may also be provided with an automatic shut-off mode, whereby the small but not zero electrical load from the car battery used to power the system is automatically shut-off when no network signal from the vehicle computer is available for a selected time period, e.g., 15–30 minutes.

Conventional driver circuitry 42 is provided to drive the speaker 16 to produce the sounds selected and/or generated by the system processor 24. The driver circuitry 42 provides the signals required to drive the speaker 16 from the low voltage control signals provided thereto by the system processor 24. The driver circuitry 42 required will depend upon the selected speaker 16 employed. As discussed above, a conventional piezo-electric speaker preferably is employed. Conventional speakers usually consist of a vibrating surface (a diaphragm) and a driving unit, which is, in most cases, a voice coil driven by a magneto motive force or piezo-electric ceramic actuator. In piezo-electric polymer speakers, the active driving element and the air-pushing diaphragm are combined into a single unit. Utilizing the piezo-electric effect of polyvinylidene fluoride (PVDF) material and the flexibility of the polymer film, a unique speaker can be formed from PVDF, which vibrates under the stimulus of an AC electric field applied to the surface electrodes on the film.

It should be noted that the speaker 16 component of an animal alerting device 10 in accordance with the present invention will be mounted outside the vehicle 12 containing the animal alerting device 10. Thus, the speaker 16 will be exposed to a variety of harsh conditions, including temperature extremes, precipitation, contact from road debris, etc. A piezo-electric speaker 16 preferably is selected for use in the system which is durable enough to withstand normal vehicle operating conditions for a reasonable amount of time, but which is sufficiently inexpensive to be readily replaceable if damaged due to an unusual (but not at all unlikely) occurrence, such as flying road debris impact or a vehicle collision.

Most newer vehicles, such as automobiles, include an on-board vehicle computer 20. The on-board vehicle computer 20 is coupled to an on-board network 44 along with a variety of vehicle sensors 46. The vehicle sensors 46 monitor various vehicle operating parameters and provide vehicle operation data, via the on-board network 44, to the vehicle computer 20. The vehicle computer 20 monitors and stores the operational information provided by the vehicle sensors 46 to provide indications to the vehicle operator when abnormal operating conditions occur (e.g., oil pressure is low) as well as to provide a record for later diagnosis of vehicle problems by maintenance personnel. One of the operating parameters provided to the vehicle computer 20 on the on-board network 44 is vehicle speed. Vehicle speed information preferably is obtained by the processor 24 of an animal alerting device 10 in accord with the present invention via a network port connection 48 to the on-board network 44. For example, the On-board Diagnostic Port Version II (the OBD II port) can be found on all automobiles manufactured in 1996 and later. It is typically found under the dashboard of the vehicle near the steering column. Preferably, an animal alerting device 10 in accord with the present invention is provided with the appropriate interface to couple the processor 24 to the OBD II or another network port 48 providing access to the vehicle speed information provided by the vehicle computer 20.

It should be understood that methods other than coupling to the vehicle computer 20 may be employed to obtain vehicle speed information for use by an animal alerting device 10 in accord with the present invention. For example, Hall effect or other sensors may be mounted near one of the vehicle's wheels to detect the rotation of magnets mounted on the wheel. By detecting the rate of rotation of the vehicle's wheel in this manner, the approximate vehicle speed may be obtained by the system processor 24. Of course, the mounting and calibration (for different vehicle wheel sizes) of such a system for determining vehicle speed makes such a method less preferable than using the vehicle speed information readily available via the network port 48 to the vehicle computer 20. Numerous other vehicle speed detection devices and/or methods may be used in accord with the present invention.

The system processor 24 of an animal alerting device 10 in accord with the present invention also may receive vehicle position information from a position detector device 22. As discussed above, the position detector 22 may be implemented, for example, as a conventional global positioning system (GPS) receiver. The GPS receiver may be used to provide a latitude and longitude coordinate for the vehicle to the system processor 24. The position detector 24, e.g., GPS receiver, may be provided as part of the animal alerting device 10, as part of the vehicle 12 in which the animal alerting device 10 is mounted, or as a separate position detector device 22. If provided as part of the vehicle 12 itself, the position detector 22 may provide vehicle position information, via the on-board network 44, to the vehicle computer 20. In such a case, the system processor 24 may obtain vehicle position information from the vehicle computer 20 or the position detector 22 via the on-board network 44 and the network port 48. Otherwise, the position information output of the position detector 22 may be provided directly to the system processor 24. As will be discussed in more detail below, vehicle position information provided by the position detector 22 to the system processor 24 may be employed by the system processor 24 to select the animal alerting sound patterns to be produced by the animal alerting device 10 in accord with the present invention based on the geographic location of the vehicle and the large animals likely to be encountered in that location.

As mentioned above, research has shown that deer and other large animals hear in the same general range as humans. Thus, as will be discussed in more detail below, an animal alerting device in accord with the present invention produces sounds in a frequency range that is audible to humans. In order for an animal alerting device in accord with the present invention to project sound effectively in front of a vehicle operating at highway speed it is necessary to amplify the sound to a relatively high level, e.g., approximately eighty decibels or more. This sound level may not be acceptable to humans, and thus preferably sound production should be curtailed when the vehicle is passing through urban or residential areas, where, in any case, an animal-vehicle collision is less likely to occur. In accord with the present invention, the volume of sound produced by an animal alerting device is adjusted automatically based on the speed of the vehicle in which the animal alerting device is mounted. As discussed, vehicle speed may be determined by the animal alerting device 10 in accord with the present invention via a network port 48 connection to a vehicle on-board computer 20. In accord with the present invention, the production of sound by an animal alerting device 10 preferably is suppressed or defeated below a certain vehicle operating speed associated with operation of the vehicle in urban or residential areas, with the production of sound by the animal alerting device initiated at vehicle speeds above this minimum speed threshold, and with the volume of the sound produced by the system increased from an initial lower volume to full volume operation at full highway operating speeds.

Figure 3:
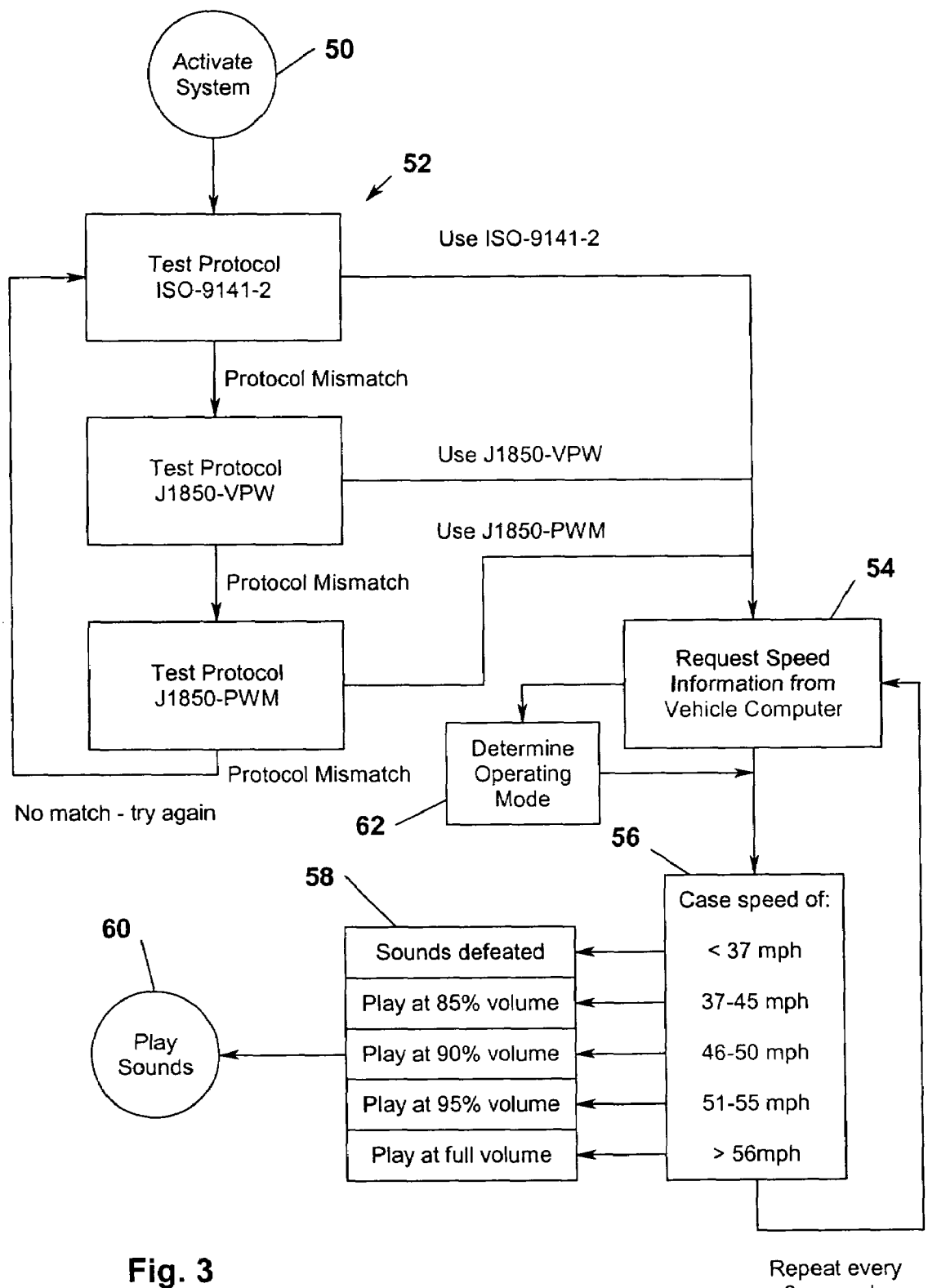
FIG. 3 is a flow chart diagram illustrating an exemplary process employed by an animal alerting device in accord with the present invention to determine vehicle speed and to select the volume of the sound produced by the system in response to the detected vehicle speed.

An exemplary method that may be implemented by the system processor 24 of an animal alerting device 10 in accord with the present invention to adjust the volume of sound produced by the animal alerting device 10 in response to vehicle speed information, obtained from the vehicle on-board computer 20, is illustrated in the flow chart diagram of FIG. 3, and will be described now with reference thereto.

After activating 50 the animal alerting device 10, the system processor 24 preferably implements a test routine to determine 52 the communications protocol employed by the particular vehicle computer 20 to which the device 10 is to be coupled. This allows a single animal alerting device design in accord with the present invention to be employed with a variety of different vehicles using different on-board network communication protocols. For example, system processor 24 may automatically test a series of possible communication protocols, to determine the appropriate protocol to use for communications, via the network 44, with the vehicle computer 20 of the particular vehicle 12 in which the animal alerting device 10 is mounted.

After having determined 52 the appropriate protocol for communication with the vehicle computer 20, the animal alerting device 10 in accord with the present invention preferably requests 54 or obtains speed information from the vehicle computer 20 periodically during operation of the device. For example, speed information may be requested 54 from the vehicle computer approximately every eight seconds or otherwise as needed so that the system can respond properly to changes in vehicle speed. Thus, it should be understood that speed information may be obtained from the vehicle computer 20 by the animal alerting device either more or less frequently than once every eight seconds.

Preferably, each time speed information is requested 54 from the vehicle computer 20 by the animal alerting device system processor 24, the processor 24 compares 56 the obtained speed information to one or more threshold levels to determine the volume 58 at which the sounds emitted by the animal alerting device 10 are to be played 60. For example, preferably it is desirable to defeat or suppress all sound production by the animal alerting device during operation of the vehicle in urban or residential areas. In such areas animal-vehicle collisions are least likely to occur, and the sounds emitted by the animal alerting device may be disturbing to some residents or pedestrians in the area of the vehicle. In such urban or residential areas the vehicle speed is likely to be relatively slow, e.g., less than a threshold speed for normal city driving. Thus, for the exemplary case illustrated in FIG. 3, in the case of a vehicle speed of less than 37 miles per hour all sound production by the animal alerting device 10 in accord with the present invention is automatically defeated. Above 37 miles per hour the animal alerting device produces a sound pattern, as will be described in more detail below, that stimulates the alertness response of large animals in the area of the vehicle, thereby to reduce the likelihood that an animal will wander or run into the path of the vehicle. At highway speeds, e.g., greater than 56 miles per hour, the animal alerting device plays the sound pattern at full volume, e.g., approximately eighty decibels. Several incremental volume levels may be provided at vehicle speeds between the speed at which sound production is initiated and the vehicle speed at which sound is produced by the animal alerting device at full volume, such that, as the vehicle speed increases, the volume level of the sound produced by the animal alerting device is increased in one or more steps to the full volume level at highway operating speeds. It should be understood that different volume levels, different numbers of volume level gradients, and different speed ranges for each volume level than those illustrated in FIG. 3 and described herein may be employed in an animal alerting device 10 in accord with the present invention.

It may be desirable that an animal alerting device in accord with the present invention automatically initiates sound production (when the device is turned on) at different threshold vehicle speeds depending upon vehicle operating conditions. For example, if the vehicle is being operated mostly in an urban area the threshold speed at which sound production is initiated may be selected to be higher than if the vehicle is being operated mostly in the country. Therefore, as discussed above, an operator of an animal alerting device 10 in accord with the present invention may be provided a mode selection switch 34 or other input whereby the operator may select from between different modes of operation wherein sound production by the device is initiated at different vehicle operating speeds. For example, when set for a country mode of operation, sound production by the device may be initiated at a lower vehicle speed (e.g., 37 mph), whereas when set for a town or city mode of operation sound production by the device may be initiated at a higher vehicle speed (e.g., 45 mph). If the option of selecting between different operating modes is provided in this manner, the process of determining the volume at which a sound pattern is to be played by the device 10 may include the step of determining periodically the selected operating mode 62, in order to determine the threshold vehicle speeds to be used in the comparison step 56 to determine the volume 58 at which the sounds are to be played 60.

An animal alerting device in accord with the present invention produces a sound pattern that is designed to stimulate the alertness response of large animals, such as deer. Since such animals hear sounds in generally the same audible range as humans, the sound produced by an animal alerting device in accord with the present invention is in the audible range. More specifically, an animal alerting device in accord with the present invention produces sounds generally in the range of 1–10 kHz and, more specifically, in the range of 1–5 kHz.

Figure 4:
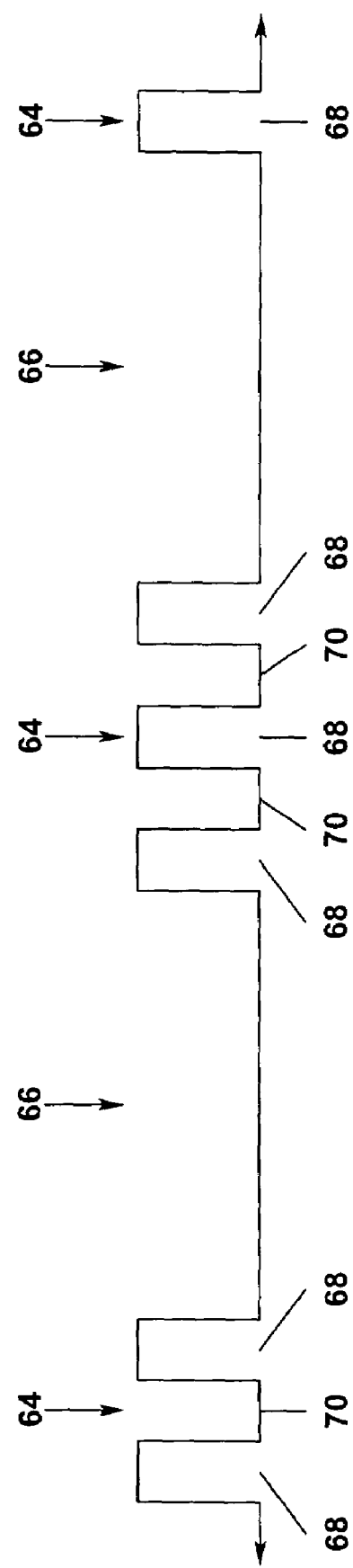
FIG. 4 is a schematic illustration showing the duty cycle of an exemplary sound pattern produced by an animal alerting device in accord with the present invention.

With reference to FIG. 4, the preferred sound pattern produced by an animal alerting device in accord with the present invention consists of a group 64 of sounds in the audible range followed by a relatively long silent period 66 between sound groups 64, followed subsequently by another group 64 of audible sounds, followed by a subsequent silent period 66 between sound groups 64, etc. Each group of sounds in the alternating pattern of groups 64 of sounds and silent periods 66 between sound groups 64 consists of one or more sound bursts or snaps 68 in an audible frequency range. Each sound or snap 68 in each group 64 of sounds is at a characteristic audible frequency, generally in the range of 1–10 kHz or, more specifically, 1–5 kHz. Each sound 68 in each group 64 of sounds may be separated by a brief silent period 70 between the sounds 68 within the group 64. The duration of the sounds 68 and the silent periods 70 within groups of sounds is relatively short, e.g., approximately 60 milliseconds in duration per sound/snap 68 or silent period 70 within the group 64 of sounds. By comparison, the silent period 66 between each group 64 of sounds is relatively long, e.g., approximately one second. Thus, the duty cycle of sound production to silence during sound production periods is relatively low, e.g., less than one to one (1:1).

In accord with the present invention, the groups 64 of sounds 68 included in the sound pattern produced by the animal alerting device preferably are randomly selected or generated. Thus, the sound pattern produced by the animal alerting device is a random sound pattern. For example, a selected number of sample sound groups 64 may be pre-generated or recorded and stored in system memory 26 of the animal alerting device 10 in a sound inventory file. A pseudo random number generator may then be used to select one of the sound groups 64 to play following each silent period 66 between sound groups 64. The silent period 66 between sound groups 64 itself may be of a fixed duration, or the duration of the silent period 66 between sound groups 64 may be randomly determined within a certain range.

For exemplary purposes only, the following nine groups of sounds may be generated and/or recorded and stored in the sound inventory portion of the animal alerting device system memory:

Group 1: two snaps consisting of one 3 kHz snap and one 2 kHz snap;
Group 2: two snaps consisting of two 3 kHz snaps;
Group 3: four snaps consisting of one 2 kHz snap and three 3 kHz snaps;
Group 4: two snaps consisting of one 4 kHz snap and one 2 kHz snap;
Group 5: two snaps consisting of two 4 kHz snaps;
Group 6: four snaps consisting of one 2 kHz snap and three 4 kHz snaps;
Group 7: two snaps consisting of one 5 kHz snap and one 2 kHz snap;
Group 8: two snaps consisting of two 5 kHz snaps;
Group 9: three snaps consisting of one 5 kHz snap, one 2 kHz snap, and one 5 kHz snap.

As described above, each snap 68 in each sound group 64 may have a relatively short duration, e.g., 60 milliseconds, and snaps 68 within sound groups 64 may be separated from each other by silent periods 70 of similar short durations.

Figure 5:
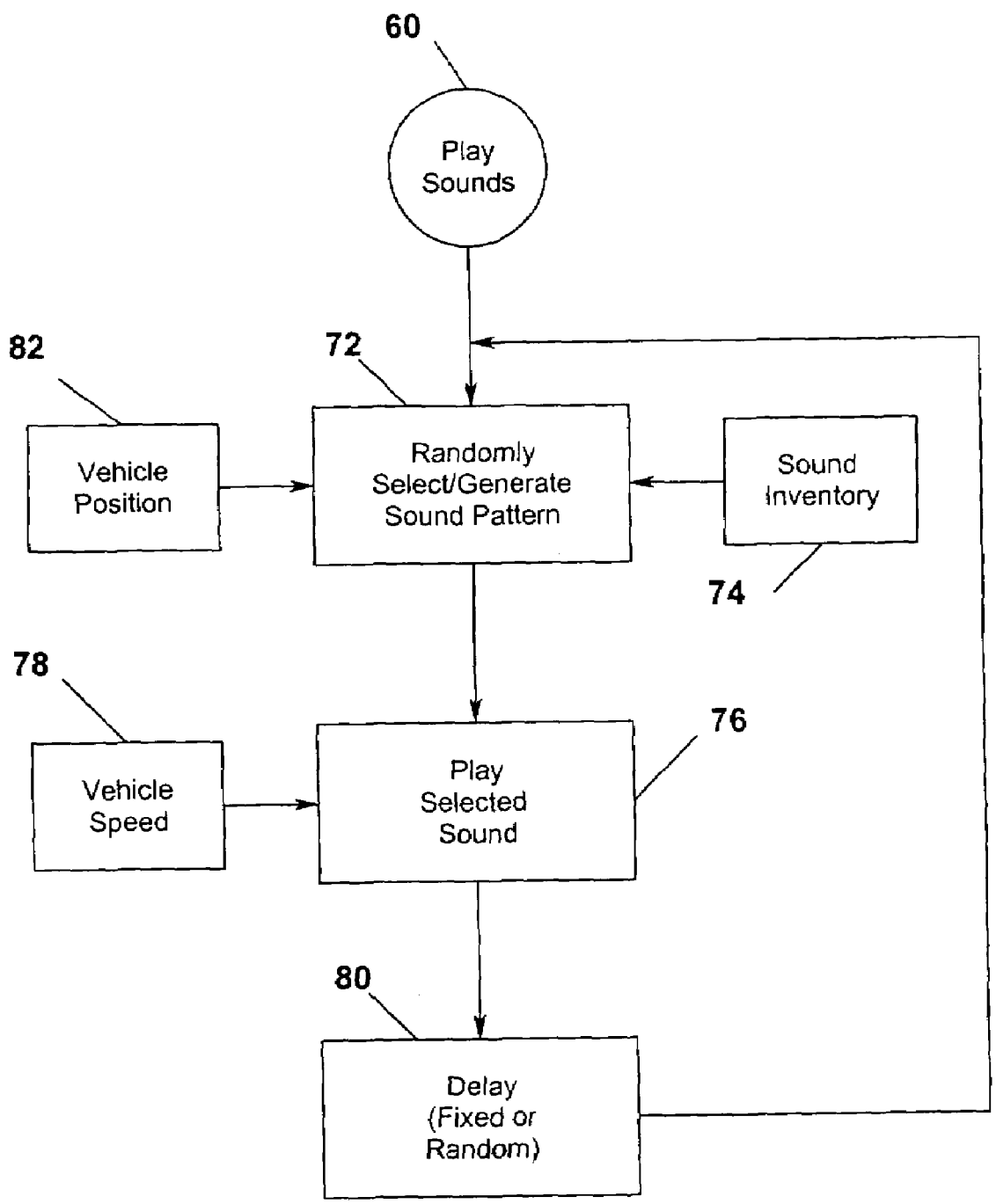
FIG. 5 is a flow chart diagram illustrating an exemplary process employed by an animal alerting device in accord with the present invention to play a sound pattern to induce an alertness response in animals.

In accord with the present invention, as illustrated in FIG. 5, a pseudo random number generator function implemented in the system processor 24 in a conventional manner may randomly select 72 one of the exemplary sound groups 64 from the sound inventory 74. The selected sound group 64 may then be played 76, at a volume determined by the vehicle speed 78 in the manner described above. A delay period 80 may then be implemented, as either a fixed time (e.g., one second) or a random period, to implement a silent period 66 between sound groups 64 before a second one of the groups 64 of sound is randomly selected for playback. The procedure is repeated in this manner such that a random sound pattern in the audible range is produced by an animal alerting device 10 in accord with the present invention. It should be noted that the term "random" as used herein, including in the claims, means that there is no repetition of the sound pattern played over a time period including the playing of many sound groups 64.

Experimentation has shown that a sound pattern such as that just described stimulates an alertness response in large animals, such as deer. Alertness (or responsiveness to a stimulus) does not translate into an instinctive or reasoned retreat by the animal from a road area. What it does offer is a reduced probability that the animal will do something impulsive. Animals alerted by an unexpected stimulus attempt to focus on the source of that stimulus, by turning of the head, moving the ears, and traversing the eyes as they search for more information. They tend not to panic, but to remain in place or slowly move to a comfort zone. The probability of an animal-vehicle crash occurring is much greater when a non-alert animal is intent on crossing a road (which it perceives as just an open space) for the purpose of eating, mating, etc. If an animal is stimulated into alertness, especially while still removed from the road, it is less likely to crash with the vehicle causing the stimulation. The realistic goal of an animal alerting system in accord with the present invention is not to eliminate animal-vehicle crashes, but to reduce them. Since damages and losses amounting to hundreds of millions of dollars annually result from animal-vehicle crashes, even a marginal reduction in crash rates would have a favorable impact on our economy and society.

Experimentation has also indicated that different large animals may respond differently to different sound patterns. For example, including sounds of different audible frequencies in the groups of sounds played as part of the sound pattern may have different effects on different large animals such as moose, deer, etc. Since different large animals typically are encountered in different areas of the world, an animal alerting device in accord with the present invention may employ the vehicle position 82 to select automatically from among different sound groups or sound patterns having different frequency as other characteristics to play back as part of the sound pattern to more effectively prevent animal-vehicle crashes with the animals that are most likely to be encountered in the particular location in which the vehicle is operating. As discussed above, the vehicle position information 82 may be obtained, in a conventional manner, using a GPS or similar system.

It should be understood that the present invention is not limited to the particular exemplary applications and embodiments illustrated and described herein, but encompasses all variations therein that come within the scope of the following claims.

What is claimed is:

1. A method for alerting animals to prevent animal-vehicle crashes, comprising:
projecting from a moving vehicle a sound pattern comprising a plurality of different groups of sounds, wherein each of the plurality of different groups of sounds includes a plurality of sounds in an audible frequency range separated by short silent periods, including automatically randomly selecting a one of the plurality of different groups of sounds to be projected from the moving vehicle followed by a long silent period that is longer in duration than the short silent periods and repeating the automatic random selection of sound groups followed by long silent periods to generate the sound pattern projected from the moving vehicle.

2. The method of claim 1 wherein a ratio of a duration of the groups of sounds to a ratio of a duration of the long silent periods is less than 1:1.

3. The method of claim 1 wherein at least one of the plurality of different groups of audible sounds includes a plurality of sounds at different audible frequencies.

4. The method of claim 3 wherein at least one of the plurality of different groups of audible sounds includes a plurality of sounds at different audible frequencies separated by short silent periods between the sounds within the group of sounds, said short silent periods having a duration similar to the duration of the sounds included in the group of sounds.

5. The method of claim 1 wherein the groups of sounds include sounds in the audible frequency range of 1 kHz to 10 kHz.

6. The method of claim 5 wherein the groups of sounds include sounds in the audible frequency range of 1 kHz to 5 kHz.

7. The method of claim 1 comprising additionally determining a speed of the moving vehicle and adjusting a volume of the sound pattern projected from the moving vehicle based on the determined speed of the moving vehicle.

8. The method of claim 7 comprising automatically initiating the projection of the sound pattern from the moving vehicle when the determined speed of the moving vehicle exceeds a selected threshold speed and automatically terminating the projection of the sound pattern from the moving vehicle when the determined speed of the moving vehicle is less than the selected threshold speed.

9. The method of claim 7 wherein determining a speed of the moving vehicle includes determining a speed of the moving vehicle from an on-board vehicle computer.

10. The method of claim 1 comprising additionally determining a location of the moving vehicle and automatically adjusting the sound pattern projected from the moving vehicle in response to the determined location of the moving vehicle.

11. The method of claim 10 wherein determining a location of the moving vehicle includes determining a location of the moving vehicle using a global positioning system.

12. An animal alerting device adapted for mounting on a vehicle to prevent animal-vehicle crashes, comprising:
a speaker;
a driver circuit coupled to the speaker for driving the speaker in response to sound generation control signals received thereby; and
a control circuit coupled to the driver circuit and adapted to generate the sound generation control signals for producing via the driver circuit and speaker a sound pattern comprising a plurality of different groups of sounds, wherein each of the plurality of different groups of sounds includes a plurality of sounds in an audible frequency range separated by short silent periods, wherein the control circuit is adapted to automatically randomly select a one of the plurality of different groups of sounds followed by a long silent period that is longer in duration than the short silent periods and to repeat the automatic random selection of sound groups followed by long silent periods.

13. The animal alerting device of claim 12 wherein the control circuit includes a microprocessor and memory, wherein the memory includes data defining the plurality of different groups of audible sounds, and wherein the microprocessor is programmed to select randomly from among the data defining the plurality of different groups of audible sounds to generate the sound generation control signals.

14. The animal alerting device of claim 12 wherein a ratio of a duration of the groups of sounds to a duration of the long silent periods is less than 1:1.

15. The animal alerting device of claim 13 wherein the data defining a plurality of different groups of audible sounds defines at least one of the plurality of different groups of sounds including a plurality of sounds at different audible frequencies.

16. The animal alerting device of claim 15 wherein the data defining at least one of the plurality of different groups of audible sounds includes data defining at least one of the plurality of different groups of sounds including a plurality of sounds at different audible frequencies separated by short silent periods between the sounds within the group of sounds, said short silent periods having a duration similar to a duration of the sounds included in the group of sounds.

17. The animal alerting device of claim 12 wherein the groups of sounds include sounds in the audible frequency range of 1 kHz to 10 kHz.

18. The animal alerting device of claim 17 wherein the groups of sounds include sounds in the audible frequency range of 1 kHz to 5 kHz.

19. The animal alerting device of claim 12 wherein the control circuit is adapted to determine a speed of the vehicle and to adjust a volume of the sound pattern produced from the speaker based on the determined speed of the vehicle.

20. The animal alerting device of claim 19 wherein the control circuit is adapted automatically to initiate the production of the sound pattern from the speaker when the determined speed of the vehicle exceeds a selected threshold speed and automatically to terminate the production of the sound pattern from the speaker when the determined speed of the vehicle is less than the selected threshold speed.

21. The animal alerting device of claim 19 wherein the control circuit is coupled to an on-board vehicle computer to determine a speed of the vehicle.

22. The animal alerting device of claim 21 wherein the control circuit is coupled to an on-board vehicle computer via an OBD-II port connection.

23. The animal alerting device of claim 12 wherein the control circuit is adapted to determine a location of the moving vehicle and automatically to adjust the sound pattern produced from the speaker in response to the determined location of the vehicle.

24. The animal alerting device of claim 23 wherein the control circuit is coupled to a global positioning system receiver to determine a location of the moving vehicle.

25. The animal alerting device of claim 12 wherein the speaker is a piezo-electric speaker.

26. A method for alerting animals to prevent animal-vehicle crashes, comprising: projecting from a moving vehicle a sound pattern comprising groups of sounds separated by silent periods, wherein each group of sounds includes one or more sounds in an audible frequency range, and wherein a ratio of a duration of the groups of sounds to a duration of the silent periods in the sound pattern is less than 1:1.

27. The method of claim 26 wherein the groups of sounds included in the sound pattern include a plurality of different groups of sounds.

28. The method of claim 27 comprising additionally including the groups of sounds in the sound pattern in a random sequence.

29. The method of claim 26 wherein at least one of the plurality of different groups of sounds includes a plurality of sounds at different frequencies.

30. The method of claim 29 wherein at least one of the plurality of different groups of sounds includes a plurality of sounds at different frequencies separated by second silent periods between the sounds within the group of sounds, said second silent periods having a duration similar to a duration of the sounds included in the group of sounds.

31. The method of claim 26 wherein the groups of sounds include sounds in the audible frequency range of 1 kHz to 10 kHz.

32. The method of claim 31 wherein the groups of sounds include sounds in the audible frequency range of 1 kHz to 5 kHz.

33. An animal alerting device adapted for mounting on a vehicle to prevent animal-vehicle crashes, comprising:
a speaker;
a driver circuit coupled to the speaker for driving the speaker in response to sound generation control signals received thereby; and
a control circuit coupled to the driver circuit and adapted to generate the sound generation control signals for producing via the driver circuit and speaker a sound pattern comprising groups of sounds separated by silent periods, wherein each group of sounds includes one or more sounds in an audible frequency range, and wherein a ratio of a duration of the groups of sounds to a duration of the silent periods in the sound pattern is less than 1:1.

34. The animal alerting device of claim 33 wherein the control circuit includes a microprocessor and memory, wherein the memory includes data defining a plurality of different groups of sounds, and wherein the microprocessor is programmed to select randomly from among the data defining the plurality of different groups of sounds to generated the sound generation control signals.

35. The animal alerting device of claim 34 wherein the data defining a plurality of different groups of sounds defines at least one of the plurality of different groups of sounds including a plurality of sounds at different frequencies.

36. The animal alerting device of claim 35 wherein the data defining at least one of the plurality of different groups of sounds includes data defining at least one of the plurality of different groups of sounds including a plurality of sounds at different frequencies separated by second silent periods between the sounds within the group of sounds, said second silent periods having a duration similar to the duration of the sounds included in the group of sounds.

37. The animal alerting device of claim 33 wherein the groups of sounds include sounds in the audible frequency range of 1 kHz to 10 kHz.

38. The animal alerting device of claim 37 wherein the groups of sounds include sounds in the audible frequency range of 1 kHz to 5 kHz.

39. The animal alerting device of claim 33 wherein the speaker is a piezoelectric speaker.

40. A method for alerting animals to prevent animal-vehicle crashes, comprising:
(a) projecting from a moving vehicle a sound pattern;
(b) determining a location of the moving vehicle; and
(c) adjusting automatically the sound pattern projected from the moving vehicle in response to the determined location of the moving vehicle.

41. The method of claim 40 wherein the sound pattern comprises a plurality of randomly selected different groups of audible sounds separated by silent periods between the groups of sounds, wherein each group of sounds includes one or more sounds in an audible frequency range.

42. The method of claim 40 wherein determining a location of the moving vehicle includes determining a location of the moving vehicle using a global positioning system receiver.

43. An animal alerting device adapted for mounting on a vehicle to prevent animal-vehicle crashes, comprising
(a) a speaker;
(b) a driver circuit coupled to the speaker for driving the speaker in response to sound generation control signals;
(c) location determining means for determining a location of the vehicle; and
(d) a control circuit coupled to the driver circuit and to the location determining means and adapted to generate the sound generation control signals for producing via the driver circuit and speaker a sound pattern and to adjust automatically the sound pattern produced from the speaker in response to the determined location of the vehicle.

44. The animal alerting device of claim 43 wherein the location determining means includes a global positioning system receiver.

45. The animal alerting device of claim 43 wherein the speaker is a piezo-electric speaker.

* * * * *

UNITED STATES PATENT AND TRADEMARK OFFICE
CERTIFICATE OF CORRECTION

| | | |
|---|---|---|
| PATENT NO. | : 7,042,340 B2 | Page 1 of 1 |
| APPLICATION NO. | : 10/645300 | |
| DATED | : May 9, 2006 | |
| INVENTOR(S) | : Roger D. Ewert and Steven J. Ylvisaker | |

It is certified that error appears in the above-identified patent and that said Letters Patent is hereby corrected as shown below:

76
On the Title page, in the Inventors:
"Roger D. Ewert, 8548 Aqua Dr., Nekoosa, WI (US) 54457; Steven J. Ylvisaker, 222 Vallewview Pl., Minneapolis, MN (US) 55419; Tom N. Thiele, 3511 Big Timber Dr., Wisconsin Rapids, WI (US) 54494" should be
-- Roger D. Ewert, 8548 Aqua Dr., Nekoosa, WI (US) 54457; Steven J. Ylvisaker, 222 Valleyview Pl., Minneapolis, MN (US) 55419--.

74
On the Title page, in the Attorney, Agent, or Firm:
"Reinhart Boerner Van Dueren s.c." should be
--Reinhart Boerner Van Deuren s.c.--.

Signed and Sealed this

Twenty-second Day of August, 2006

JON W. DUDAS
*Director of the United States Patent and Trademark Office*